UNITED STATES PATENT OFFICE.

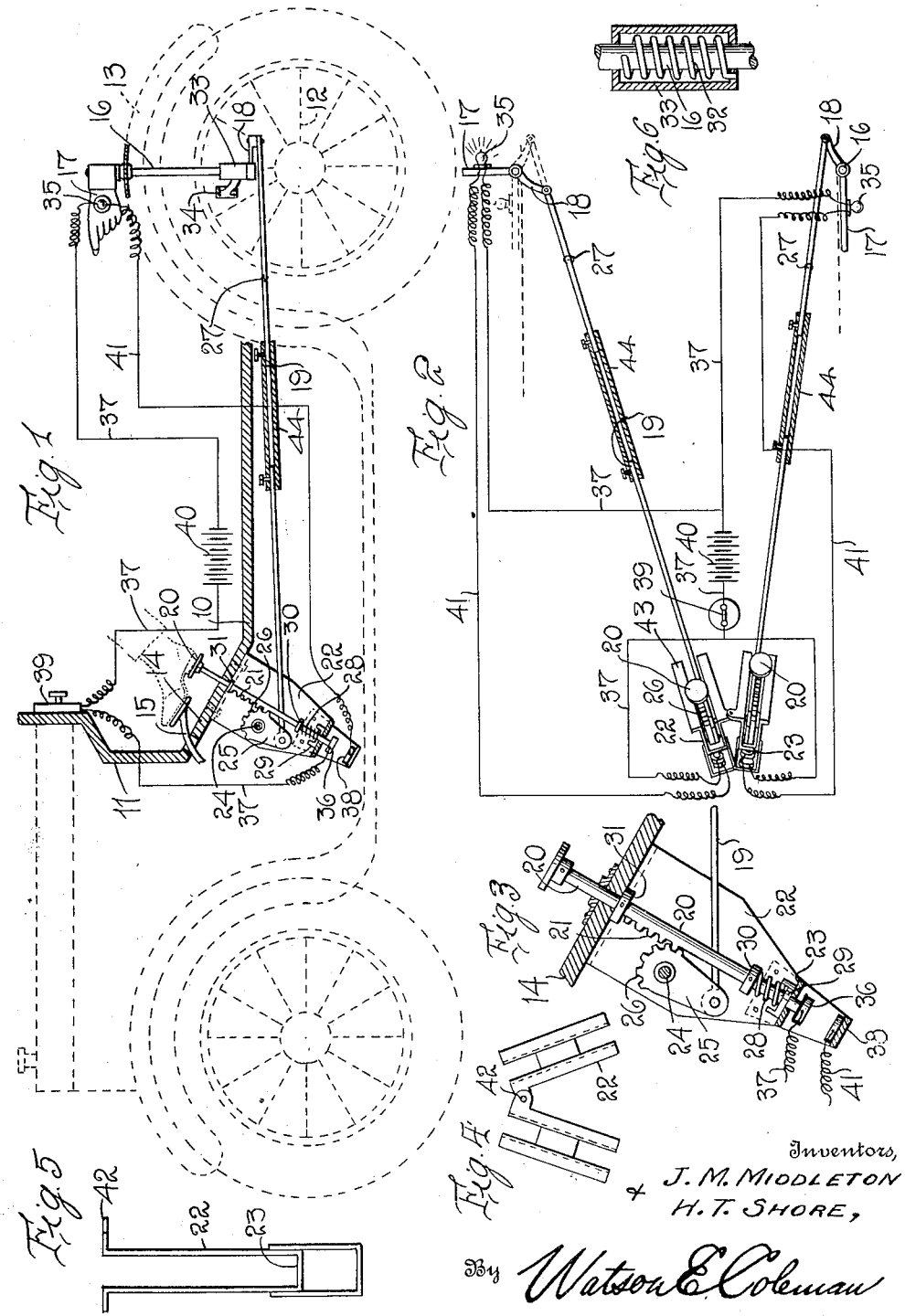

JOHN M. MIDDLETON AND HENRY T. SHORE, OF SAVANNAH, GEORGIA, ASSIGNORS OF ONE-THIRD TO FRANK DIETER, OF EAST SAVANNAH, GEORGIA.

OPERATING MEANS FOR AUTOMOBILE DIRECTION-INDICATORS.

1,219,757.  Specification of Letters Patent.  Patented Mar. 20, 1917.

Application filed April 1, 1916. Serial No. 88,374.

*To all whom it may concern:*

Be it known that we, JOHN M. MIDDLETON and HENRY T. SHORE, citizens of the United States, residing at Savannah, in the county of Chatham and State of Georgia, have invented certain new and useful Improvements in Operating Means for Automobile Direction-Indicators, of which the following is a specification, reference being had to the accompanying drawings.

This invention relates to signaling devices, and has particular reference to direction indicators for automobiles whereby the chauffeur of a vehicle may give warning to a vehicle approaching from the rear, of the direction in which he intends to turn the car.

The general object of the invention is the provision of a simple and efficient mechanism to this end wherein the signals may be shifted by the foot of the operator and in this connection to provide a signal operating means which may be operated by that foot of the operator which is normally on the clutch pedal.

A further object of the invention is the provision of mechanism to this end including two plungers disposed in such position to the clutch pedal that the heel of the operator may depress either one of the plungers by a slight motion of the foot to operate either the right or the left hand signal, and in this connection to so construct the housings or supports for the operating mechanism that the housings may be adjusted to bring the actuating plungers nearer to or farther from each other and increase or decrease the angles of the connecting rods extending from these plungers.

A further object of the invention is the provision of an indicating mechanism of this character including two indicating pointers operatively supported at the rear of the machine, and preferably upon the rear mud guards, these pointers normally lying flat against the sides of the vehicle but being turned either to the right or to the left by the operating mechanism heretofore stated, and in this connection to provide means whereby the indicating pointers may carry illuminating means and provide means whereby the illuminating means will be normally deënergized but will be energized upon the full depression of a plunger.

Other objects will appear in the course of the following description.

The invention is illustrated in the accompanying drawings, wherein:

Figure 1 is a longitudinal sectional view of a portion of the body of an automobile, the body being indicated generally by dotted lines and showing our signal operating mechanism applied thereto, this view showing diagrammatically electric light connections to one of the indicating devices;

Fig. 2 is a top plan view of the indicator operating mechanism and the indicators, and showing diagrammatically the electric light connections;

Fig. 3 is an enlarged vertical sectional view through one of the actuating devices;

Fig. 4 is a top plan view of the yokes or support for the operating mechanism showing how these yokes are connected together so that they may be adjusted to greater or less divergence;

Fig. 5 is an elevation of one of the yokes; and

Fig. 6 is a sectional view of the bearing housing 33 showing the shaft 16 and the spring 32 in elevation.

It is to be understood that a pair of indicators are provided, one for attachment to each side of the automobile, one being intended for operation when the machine is turned to the left while the other is operated when the machine is turned to the right. Both of these indicators are of similar construction and operated by like actuating mechanism, and therefore a description of one indicator and its operating mechanism will suffice for both.

Referring to the drawings, and particularly to Fig. 1, 10 designates the floor of an automobile with the dashboard 11. The automobile is provided, of course, with the rear wheels 12 and the rear mud guards 13 which are illustrated in dotted lines. Disposed in the upwardly inclined portion 14 of the floor is the clutch pedal 15. The clutch pedal itself is shown but not the operating connections as these are well known and may be of any suitable form.

Mounted upon the rear end of the automobile on each side of the body, and as illustrated in Fig. 1, mounted on each mud guard 13 is a vertical shaft 16 which extends upward through the mud guard and carries at its upper end the indicating pointer 17 which has the similitude of a hand but which may have any other suitable form. Normally this indicator, as shown for the lower indicator in Fig. 2, lies against the side of the automobile, and by rotating the shaft 16 it is obvious that the indicator will be turned out at right angles to the side face of the automobile, as illustrated for the upper indicator in Fig. 2. To this end, the shaft 16 at its lower end is mounted in a suitable bearing which will be later stated, and has a radially extending arm 18. This arm is connected by a jointed connecting rod 19 to an actuating mechanism which will be now described.

For each indicator 17 and its corresponding shaft, there is provided a plunger 20 which extends upward through the floor of the automobile in a position adjacent to the clutch pedal 15 and which is provided with the rack teeth 21, as illustrated most clearly in Fig. 3. This plunger is mounted in a U-shaped yoke or housing 22 having a transversely extending web 23 above its lower end through which the lower end of the plunger slides. Mounted in this U-shaped housing or yoke is a short transverse shaft 24 which carries upon it the arm 25, one extremity of which is sector-shaped and provided with the teeth 26 engageable with the rack teeth 21. It is obvious now that by a depression of the plunger the arm 25 will be oscillated. The arm is pivotally connected to the connecting rod 19. This rod, more or less adjacent the crank arm 18, is provided with a joint 27 whose purpose is of course obvious.

The plunger 20 is urged upward by means of a coil spring 28 which bears against the seating member 29 carried upon the web 23, and at its upper end this coil spring bears against a collar 30 which is vertically adjustable upon the plunger. The upward movement of the plunger is stopped by a collar 31 attached to the plunger. It will be seen, therefore, that the plunger is normally raised by the spring 28 but may be depressed upon pressure being applied to it and that normally the indicators 17 are retained in position against the side faces of the vehicle while upon a depression of one or the other of the plungers one or the other of the signals will be shifted to a display position. The action of the spring 28 may be assisted by a coil spring 32 surrounding the shaft 16 and engaged at one end with the boxing 33 through which the shaft 16 passes, and at its other end engaged with this shaft 16, this boxing being mounted upon a bracket 34 attached to the side of the vehicle or disposed in any other suitable position, it being understood of course that the shaft 16 is disposed between the wheel and the side of the body.

It is of course necessary that the indicators shall be as visible at night as during the day, and to this end each of the indicators 17 is provided with an electric lamp 35 connected in circuit with a battery and provision is made for entirely breaking the circuit from the battery to the lamps or for breaking the circuit only when the plungers are raised and completing the circuit when the plungers are fully depressed. To this end, we form each of the plungers with a head 36 which is insulated from the body of the plunger, as clearly shown in Fig. 3, and which is connected to a wire 37 or other suitable conductor, and we mount upon the bottom or lower end of the yoke 22 a contact member 38 which is also insulated from the yoke, as shown in Fig. 3, and with which the head or contact member 36 is adapted to electrically engage when the plunger is fully depressed. We have illustrated each of the contact members 36 as being electrically connected to a wire 37, as before stated, which wire passes to a switch 39 and thence to a battery 40, and from thence to one of the terminals of the electric lamp 35. From the other terminal of the electric lamp, a wire 41 leads to the contact member 38. It will now be obvious that if the switch 39 is turned so as to complete the circuit through the lamps at this point, then a complete depression of either one of the plungers 20 will cause the closing of the circuit through the lamp corresponding to the plunger depressed, and this ignition of the lamp only occurs when the plunger has been fully depressed.

As illustrated in Fig. 4, the yokes or housings 22 are preferably pivoted to each other by ears 42 disposed at the adjacent corners of the housings. By this means the housings may be turned either into parallel relation or into a greater or less angular relation. The reason for this is obvious. If the car is relatively long, the angle between the connecting rods 19 will be less than if the car is relatively short, and thus by pivoting the yokes to each other, we provide means whereby they may be angularly adjusted so that the connecting rods may have proper angular relation to each other. Each of the yokes 22 is preferably provided at its upper end with flanges 43 whereby it may be attached to the floor of the car.

The operation of the invention will be obvious from what has gone before. As before stated, the driver ordinarily keeps the toe of his shoe upon the clutch pedal 15. By depressing his heel or by shifting his foot so as to bring his heel over one or the other of the pedals 20 and depressing the heel, it is obvious that the corresponding plunger 20 will be depressed, thus shifting the corresponding indicator 17. As soon as pressure is released the springs 28 and 32 will act to return the parts to their normal position. If the switch 39 be turned to close the circuit, then upon the completion of the depression of the plunger and swinging out of the indicator the lamp of the indicator will be energized. During the day, of course, the switch will be turned so as to break the circuit. It will be seen that this mechanism is very simple, that it may be applied to practically any make of automobile, that it is not in the way of the mechanism ordinarily found in automobiles, and that there are relatively few parts. It will of course be obvious that while we have illustrated the signal actuating means on a relatively large scale as regards the car upon which the mechanism is mounted, that these parts may be of relatively small size.

It is also of course evident that this signaling device may be used on cars having either a left hand drive or a right hand drive, and to this end it is best to make the connecting rods 19, so that they may be lengthened or shortened. Thus the two sections of the rod 19 may have telescopic engagement with each other as illustrated in the drawings by means of a sleeve 44 and a set screw.

Having described the invention, what we claim is:

1. As a means for operating the direction signals of automobiles, a yoke, a vertically depressible toothed plunger mounted in said yoke, a spring urging the plunger in one direction, a toothed sector gear engaged by the teeth on the plunger and having an arm extending radially therefrom, and an operative connection attached to said arm.

2. Means for operating the direction signals of automobiles comprising a pair of yokes pivotally connected to each other for adjustment into angular or parallel relation, plungers extending each through one of the yokes, a spring for each plunger urging it in one direction, and operating means with which the plungers engage.

3. Means for operating the direction signals of automobiles comprising a pair of yokes pivotally connected to each other for adjustment into angular or parallel relation, plungers extending each through one of the yokes, operating means with which said plungers engage and shiftable by a movement of the plungers, and connecting rods attached to said operating means and adjustable for length.

In testimony whereof we hereunto affix our signatures in the presence of two witnesses.

JOHN M. MIDDLETON.
HENRY T. SHORE.

Witnesses:
W. J. RYAN,
JOHN A. CLEARY.

Copies of this patent may be obtained for five cents each, by addressing the "Commissioner of Patents, Washington, D. C."